Patented Nov. 21, 1922.

1,436,230

UNITED STATES PATENT OFFICE.

REGINALD A. W. BLACK, OF WINNIPEG, MANITOBA, CANADA.

PROCESS FOR THE SEPARATION OF MAGNESIA FROM LIME AND PREPARATION OF WATER THEREFOR.

No Drawing.   Application filed October 29, 1921.   Serial No. 511,478.

*To all whom it may concern:*

Be it known that I, REGINALD AUSTEN WILLIAM BLACK, a subject of the King of Great Britain, residing in the city of Winnipeg, Province of Manitoba, Canada, have invented new and useful Improvements in Processes for the Separation of Magnesia from Lime and Preparation of Water Therefor, of which the following is a clear and exact specification.

At the present time the commercial supply of magnesia (MgO) for use in refractory furnace linings, heat insulating materials, chemical manufactures, cements and druggist supplies, and for other purposes, is obtained principally by treatment of magnesite, a rock or natural substance consisting almost entirely of magnesium carbonate ($Mg\ CO_3$) and found only in limited areas on the earth's surface.

I have conceived the idea that much larger sources of this valuable material can be made available by proper treatment of other substances than magnesite, for example, high magnesian dolomite or magnesian limestone, which is almost universally distributed, and I have invented a process for treating such materials in a commercial way to yield the contained magnesia in a marketable form.

Dolomite or magnesian limestone is a rock containing varying proportions of calcium carbonate ($Ca\ CO_3$) and magnesium carbonate ($Mg\ CO_3$) together with traces of silicia, alumina, iron and occasionally other impurities. All impurities, however, are present in such small amounts that they need not be taken into consideration in this description.

In my process I follow a usual procedure by first crushing and calcining the raw material, which yields a mixed residuum of calcium and magnesium oxides, that is, lime and magnesia.

For my purpose calcination may be carried out at any temperature sufficiently high to dissociate carbon dioxide from the oxides in the carbonates forming the raw material, and I desire particularly to point out that this wide range of temperature is to be distinguished as a feature of my process compared with the calcination temperatures of other processes which have for their object the avoidance of production of dead burned or under burned oxides as the case may be. The carbon dioxide removed from the carbonates at this stage of the process is collected and used at a later stage in the process as will be described.

The next step in my process is to thoroughly and cautiously slack or hydrate the lime of the mixed oxides with only a sufficient volume of water to fulfill the chemical requirements for the formation of hydrate of lime.

My next step is to add specially treated water in a sufficient amount to dissolve all of the calcium hydroxide present, which as is commonly known, will require from 500 to 600 parts by weight compared with the original lime. I have discovered that at this stage of the process the magnesia will remain undissolved owing to the inhibiting influence of the lime in the solution. The original water used at this stage is prepared by treating water from the source of supply with lime to the point of saturation, and subsequently with carbon dioxide until slightly under 100% of the calcium hydrate in solution has been precipitated; the water, which is then free from carbon dioxide and slightly alkaline in reaction, being filtered off from the precipitated calcium carbonate. It will be seen later in this description that the circulation water in my process likewise arrives at this condition suitable for the first stage as a result of the other stages of the process.

My next step is to decant or filter off the solution of calcium hydroxide from the magnesia, and to pass it into another vessel or into scrubbing towers, where it receives treatment with the carbon dioxide from the calcination to the same degree as described above for the original water, and, after decantation or filtration is suitable for return to the first stage. The precipitated calcium carbonate is passed through a filter and may be subsequently dried and marketed as precipitated chalk, or may be recalcined and marketed as quick lime.

Referring to the magnesia which constitutes the residuum in my first treatment with water, following the hydration of the calcined oxides, this material is not sufficiently pure for drying and marketing without further treatment in the filter as it will still contain a small percentage of lime and magnesium carbonate. It is therefore thoroughly washed with the specially prepared water to remove the balance of the lime, after which I dry and recalcine it, obtaining a final product suitable for powdered magnesia or for manufacturing into refractories.

It will be observed that my process minimizes the amount of water required for the removal of the lime, since there is a circulation through the system of approximately a constant amount of water which is used over and over again. It will be further observed that any water which it is necessary to run to waste is either neutral or slightly alkaline in reaction, and that therefore no damage can be caused by this water as might be the case if I did not neutralize the calcium hydroxide by the use of the carbon dioxide.

I claim:—

1. The process for the commercial separation of magnesia which comprises treating calcined dolomite with water which has been previously saturated with lime and treated with carbon dioxide to remove slightly less than 100% of the calcium hydroxide formed by the lime, leaving the water with a slightly alkaline reaction.

2. The process of preparing water for use in the separation of magnesia from lime which consists in calcining mixed carbonates of magnesium and calcium, collection of the carbon dioxide given off, and treatment of water, containing calcium hydroxide, with the carbon dioxide so as to precipitate slightly less than 100% of the calcium hydroxide.

3. In a continuous process for the separation of magnesia from lime by the use of water as a solvent, for the lime, the reduction of the amount of the process water to the minimum by treating it with carbon dioxide, after solution of the lime has been effected, so as to precipitate slightly less than 100% of the calcium hydroxide in solution.

Signed at New York, in the county and State of New York, this 25th day of October, 1921.

REGINALD A. W. BLACK.